(12) United States Patent
Eno

(10) Patent No.: US 7,762,662 B1
(45) Date of Patent: Jul. 27, 2010

(54) COLORED AND RING-PATTERNED CONTACT LENSES

(76) Inventor: Robert C. Eno, 5150 S. Oakridge, #96, Pahrump, NV (US) 89049

( * ) Notice: Subject to any disclaimer, the term of this patent is extended or adjusted under 35 U.S.C. 154(b) by 340 days.

(21) Appl. No.: 11/745,616

(22) Filed: May 8, 2007

Related U.S. Application Data

(60) Provisional application No. 60/798,977, filed on May 8, 2006.

(51) Int. Cl.
*G02C 7/04* (2006.01)
*G02C 7/02* (2006.01)
(52) U.S. Cl. .................. 351/162; 351/177
(58) Field of Classification Search ............. 351/162
See application file for complete search history.

(56) References Cited

U.S. PATENT DOCUMENTS

| | | | | |
|---|---|---|---|---|
| 4,120,570 A | | 10/1978 | Gaylord | |
| 5,302,978 A | * | 4/1994 | Evans et al. | 351/162 |
| 6,513,930 B2 | * | 2/2003 | Hsu | 351/162 |
| 6,767,097 B2 | * | 7/2004 | Streibig | 351/162 |
| 6,811,256 B1 | * | 11/2004 | Becherer et al. | 351/162 |
| 7,246,903 B2 | | 7/2007 | Bowers et al. | |
| 2002/0027637 A1 | * | 3/2002 | Jahnke | 351/162 |
| 2003/0035083 A1 | * | 2/2003 | Francis et al. | 351/162 |
| 2003/0117576 A1 | * | 6/2003 | Thakrar et al. | 351/162 |
| 2004/0056371 A1 | * | 3/2004 | Liao et al. | 264/2.5 |
| 2005/0237483 A1 | * | 10/2005 | Phelan | 351/162 |

OTHER PUBLICATIONS

Appendix E—Color Additives for Medical Devices; U.S. Food and Drug Administration, Center for Devices and Radiological Health, http://www.fda.gov/cdrh/dsma/pmaman/appdxe.html; (accessed Jan. 15, 2009), 19 pages.
Polyether Pasts; Akrochem Corporation, Colors Dispersions, http://www.akrochem.com/pdfs/Colors/x-etherpastes.pdf; (accessed Jan. 15, 2009), 1 page.

* cited by examiner

*Primary Examiner*—Jordan M. Schwartz
(74) *Attorney, Agent, or Firm*—Fish & Richardson P.C.

(57) ABSTRACT

Structures of contact lenses, methods and systems for making such contact lenses where the contact lenses have an opaque ring pattern.

20 Claims, 1 Drawing Sheet

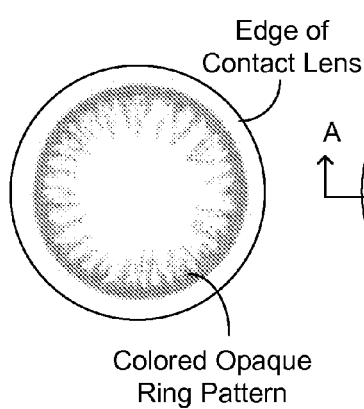
FIG. 1A
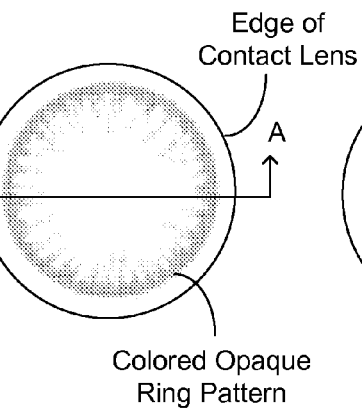
FIG. 1B
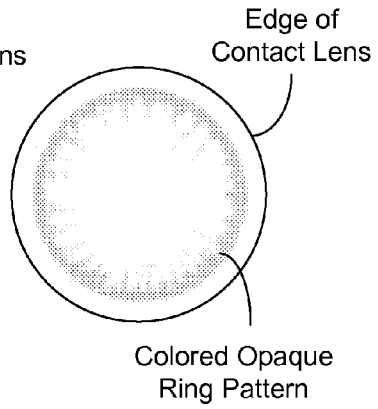
FIG. 1C
FIG. 2
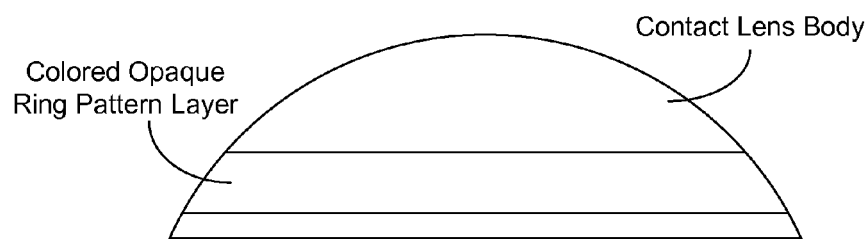

COLORED AND RING-PATTERNED CONTACT LENSES

This application claims the benefit of U.S. provisional application No. 60/798,977 entitled "COLORED AND RING-PATTERNED CONTACT LENSES" and filed on May 8, 2006, the entire disclosure of which is incorporated by reference as part of the specification of this application.

BACKGROUND

This application relates to structures and materials of contact lenses, and associated fabrication processes.

Contact lenses may be colored to exhibit certain colors. Some colored contact lenses, however, produce an unnatural appearance to the eyes. Hence, there is a need for colored contact lenses that give a natural appearance to the eyes. Various designs of contact lenses have been proposed in an attempt to achieve a natural appearance to the eyes. U.S. Pat. No. 6,523,953, for example, describes colored contact lenses having a non-opaque pupil section and a colored pattern in the iris section for a natural appearance.

SUMMARY

In one implementation, this application describes a device that includes a contact lens made of a contact lens material to fit into an eye; and an opaque ring pattern embedded in a surface of the contact lens to expose a central portion of the contact lens and to form a ring around the peripheral portion of the contact lens. The opaque ring pattern is smaller in diameter than the contact lens to leave a space on the contact lens between an outer edge of the an opaque ring pattern layer and an outer edge of the contact lens.

This and other implementations are described in greater detail in the drawings, the detailed description and the claims.

BRIEF DESCRIPTION OF DRAWINGS

FIGS. 1A, 1B, and 1C illustrate three examples of contact lenses with colored and opaque ring patterns in three different colors.

FIG. 2 shows a cross section of the exemplary contact lens shown in FIG. 1B along the lines AA to illustrate the structure of the colored opaque ring pattern.

DETAILED DESCRIPTION

This application describes, among others, implementations of colored contact lenses with colored ring patterns in the peripheral areas of the contact lenses surrounding the pupil area of an eye. The peripheral ring patterns and their colors are specifically designed to achieve natural and enhanced appearance of the eyes. The colored regions in the peripheral areas of the lenses are opaque and thus are different from tinted colors used in some other contact lenses. The lens material on which the colored opaque regions are formed may be tinted with a color. In some implementations, the colored ring patterns can be designed to enhance the appearance of the eyes without changing the basic natural colors of the eyes.

FIGS. 1A, 1B, and 1C illustrate three examples of contact lenses with colored and opaque ring patterns in three different colors. The outer edge of each ring pattern is smaller than the outer edge of the contact lens. The ring region between the outer edge of the ring pattern and the outer edge of the contact lens is located in the sclera area of the eye when the lens is placed in the eye. The central region in each of the exemplary contact lenses is sized to cover at least the pupil of the eye and may be optically transparent and clear or may be tinted with a selected color. The opaque ring pattern in each example is sized to allow a portion of the iris of the wearer's eye to show through the central region of the contact lens. The ring enhances and highlights the eye with a unique appearance. The lens is configured to breathe and allow oxygen to permeate through to the cornea of the eye more freely than other colored opaque lenses. The lens colored peripheral ring pattern, when properly placed in an eye, is positioned above and thus covers the limbal or peripheral portion of the cornea or iris. The ring pattern is generally a circular pattern and may be designed with various patterns such as spatially distributed colored opaque dots in a ring or ring-like pattern, or connected colored opaque islands forming a ring or ring-like pattern. The ring pattern may include various geometrical features such as bands, laces, swirls or fingers of color, which extend towards the midsection of the iris or colored portion of the wearer's eye. These fingers of color fade out as they scatter in from the peripheral main section of the major colored portion of the lens towards the center of the contact lens. When worn, these fingers of color blend with the natural pattern of the iris and allow the overlapped regions of the underlying iris to show through, creating a natural and enhanced appearance or look to the eye.

Examples of dimensions of contact lenses for a wet lens with 42% of the water content are the wet diameter of the lens is 14.2 mm, the anterior dimension (A.O.Z.) at −7.00 is 7.7 mm, the posterior dimension (P.O.Z.) at −7.00 is 12.2 mm, and the peripheral curve width is 1.0 mm. On such a lens, the outer diameter of the colored ring may be 12.7 mm; the average inside diameter of the main color swirls may be between 9.0 mm and 9.5 mm, and the average inside diameter of the fingers going inward toward the center of the lens may be between 7.9 mm to 8.4 mm. The average width of the ring pattern, which is measured in and out of the swirls or lace design and does not include the fingers or light trails of dots towards the mid-region of the lens, is between 1.1 mm and 2.0 mm. The largest width of the ring pattern, which includes the fingers or light trails of dots towards the mid-region of the lens, may be between 2.25 mm and 2.50 mm. The space between the outside diameter of the colored ring pattern and the lens edge may be 0.75 mm in a 14.2-mm lens and 0.90 mm in a 14.5-mm lens.

A colored opaque ring pattern as described above may be embedded within the contact lens body via various processes. FIG. 2 shows a cross section of the exemplary contact lens shown in FIG. 1B along the lines AA to illustrate the structure of the colored opaque ring pattern. The underlying contact lens may be made of various suitable contact lens materials and may be a clear contact lens without any color or a tinted lens to show a selected color. The central area of the lens surrounded by the colored opaque ring pattern may be designed to reflect the blue, green or violet tint colors or other visible tint colors which are tinted in the lens material itself. The colored opaque ring pattern may be fused into the contact lens surface so that the colored opaque ring pattern is embedded in the lens material and the surface of the lens in the area where the colored opaque ring pattern is located is smooth for wearing comfort.

The formation of the embedded colored ring patterns in the contact lenses based on the printing processes described here beneficially makes the outmost peripheral region or the edge of the contact lenses more flexible than the contact lenses without such embedded ring patterns. In comparison with contact lenses without such embedded ring patterns, this property of the present contact lenses provides improved fitting of the contact lens to the eye and enhanced comfort in wearing of the lenses.

Specific examples of the colored materials for forming the colored opaque ring patterns and printing processes for embedding the color opaque ring patterns in the lens surfaces are described in detail below.

The initial colored material for forming a final colored opaque ring pattern on a contact lens is a mixture of different materials including one or more colorants, dyes or pigments depending on the desired color to be produced. A variety of different color formulas may be used depending on the color and the specific shade of that color.

As an example, a printing paste mix for a colored and opaque ring pattern that changes the color of the eye may be made by mixing a white base pigment with one or more pigments in other colors to achieve the desired color. The use of the white pigment makes the final color of the colored opaque ring pattern on the lens to appear more natural than a mixture without the white pigment. The amount of the white pigment is optimized for a specific desired color of the mixture. If the white pigment is less than the optimized amount, the color of the final opaque ring pattern on the lens can be different from the desired color and hence does not have the proper color change properties. If the white pigment is more than the optimized amount, the opaque ring pattern on the lens may appear too bright and un-natural. In addition to the white pigment and the one or more pigments in other colors, a clear neutral color can be added to thin the mix or lighten a particular color shade.

The contact lens material may also be colored with a translucent tinted color to further enhance the combined color effect of the colored opaque ring pattern and the tinted lens material, for example, a phthalocyanine blue pigment sold under the trade name of pigment blue 15 CI-74160. Other tinted colors such as Green and Violet may also be used. Some examples of suitable colorants for tinting the contact lenses are described in "Color Additives for Medical Devices," published by FDA at its website.

Some examples of colorant pastes that are approved by FDA and can be used for implementing the colored opaque ring patterns of this application are described at the website of Akrochem Corporation (see, e.g., X-etherpastes). The examples of colorant pastes are summarized in TABLE 1 below:

TABLE 1

Akrochem's Polyether Paste series is comprised of various organic and inorganic color pigments dispersed in a 3500 molecular weight propylene oxide adduct of glycerine (polyether resin).
Typical colors available:

| | Pigment Type | C.I. name | Product Numbers |
|---|---|---|---|
| Blue: | Phthalocyanine | Blue 15:1 | E-401 (light blue) |
| | | Blue 15:1 | 5045B (dark blue) |
| Violet: | Carbazole | Violet 23 | E-882 (light violet) |
| Green: | Phthalocyanine | Green 7/White 6 | E-2300 (light green) |
| | | Green 7 | 5046 (standard green) |
| Red: | Ba Red 2B | Red 48:1 | E-1461 (yellow shade) |
| | Ba/Ca Red 2B | Red 48:1/48:2 | E-5827A (medium red) |
| Yellow: | AAOT Diarylide | Yellow 14 | 5047B |
| Orange: | Dianisidine | Orange 16 | 5041 |
| | Blend | | E-7195 |
| Brown: | Brown Oxide | Brown 7 | E-8967 |
| | Organic Blend | — | 5056 |
| Black: | Carbon Black | Black 6 | 5049 |
| White: | Titanium Dioxide | White 6 | E-8888 |

TABLE 1-continued

Akrochem's Polyether Paste series is comprised of various organic and inorganic color pigments dispersed in a 3500 molecular weight propylene oxide adduct of glycerine (polyether resin).
Typical colors available:

| Pigment Type | C.I. name | Product Numbers |
|---|---|---|

T—ether pastes

After the proper species and amounts of white and other color pigments are selected, a thickening agent is added to the mixture to thicken the mixture. The thickened mixture allows for better print of the ring pattern on the lens or mold. Various thickening agents may be used, including some organic materials such as pre-polymers. For example, an acrylic prepolymer or a concentrated mixture of HEMA (crystals 2-hydroxyethylmethacrylate sold under CAS # 19,206-6 or 25249-16-5 from Aldrich Chemical) may be used as the thickening agent. A partially polymerized monomer of HEMA may be used as a thickening agent, but can be complex and difficult to control its viscosity. The process for preparing the partially polymerized monomer of HEMA with proper viscosity for the mixture often involves expensive measuring equipment and a long processing time (e.g., 72 hours or more to formulate). In addition, a clear coat may be printed over the color coat prepared with the partially polymerized monomer of HEMA. This complicates the process and reduces the comfort level of the final lenses due to the extra clear coating.

The acrylic prepolymer or concentrated mixture of HEMA, when used as the thickening agent in forming the mixtures described in this application, is cured at a high temperature at about 120 degrees Celsius in a vacuum oven to achieve a super smooth and low profile of the ink mixture on the front surface of the lens. For example, the curing time may be 2 hours and the process is completed with an annealing process for about 2 hours to allow the oven to cool down before the cycle is finished. Also the qualities of prints on the lens surface are much sharper with clear images, not smudgy or rough with overlapping colors. The vacuum removes any bubbles or pot marks in the ink due to gas exploding in the curing process.

Contact lenses are immersed in water in normal use. Hence, the water content of the lens material and the water content of the colored ink for forming the ring pattern should be as close as possible and ideally should be equal. When the water content in the colored ink is too low in comparison with that of the hydrated lens, the lens tends to warp and thus distort from a desired shape for its normal operation. Therefore, the color pigment or pigments in the ink should be formulated to be hydrophilic to absorb water. Hence, in some implementations, a high water content HEMA formulation may be added to the ink to increase the actual water content of the colored ink.

The ink mixture may include a silicone material (e.g., siloxane monomers) as an additive to increase in the DK content or Oxygen permeability of the lens. The monomers, glycerly methacrylate methyl methacrylate and vinyl-pyrrolidone can also be added to increase water and DK content. Silicone-added ink mixtures may be used with silicone lenses to better match the material properties of the final ring patterns formed from the ink mixtures and the lenses. A variety of silicone lens materials may be used. U.S. Pat. No. 4,120,570 describes some examples and is incorporated by reference as part of the disclosure of this application.

In implementation, catalyst and bonding agents may be used to polymerize the color ink and bond the color ink to the lens surface. Different formulations for the color inks may be used depending on whether the lens is molded or spin cast because the colored ink reacts differently to lenses made from different processes. Different chemicals can be used as the catalyst and bonding agents. Examples include Benzoyl Peroxide 242.23, AIBN-Especially VAZO-64 manufactured by Dupont Chemical where VAZO-64 is a thermal catalyst and a UV catalyst such as Irgacure from CIBA or USP-245 can also be substituted, Hexamethylene Diisocyanate 168.19, Toluene Diisocyanate, Ethylene Glycol Dimethacrylate (EGDMA), Glyceryl Methacrylate, methyl methacrylate (GMMA), Methacrylic Acid 86.09 or 62747 (MAA), TRIS-Silicone (Siloxane monomers, prepared and mixed with Hema), 2-hydroxyethyl-methacrylate (HEMA w/10-50 PPM MEHQ inhibitor), Irgacure (Photoinitiator from Ciba, UV Catalyst) spin casting/molding, TMPTMA BISOMER® (Trimethylolpropane Trimethacrylate) Hardening agent, Monomethyl ether of hydroquinone (MEHQ).

In some formulations, the monomer 2-hydroxyethyl-methacrylate can be used as the main component. This monomer, also well known in the trade as HEMA, can be distilled or filtered to remove the unwanted MEHQ inhibitor. A simple and unique filtering process is detailed below. Levels of 10-PPM MEHQ or below may be used.

The filtering to remove the MEHQ inhibitor from the HEMA may be performed as follows. A column charcoal filter system may be used to drip HEMA through a filter and capture the filtered HEMA in a container. The filtered HEMA can be stored in the refrigerator until ready for use. This is a much easier and safer method than distillation. After the HEMA is filtered and prior to use, the MEHQ of 4 PPM by weight can be added back into the monomer to retard the polymerization and to set a standard level of MEHQ for consistency.

One example of the HEMA formulation is 50.00 grams of 2-hydroxy ethyl methacrylate (liquid) HEMA, 1.82 grams of Methacrylic Acid (MA), 0.20 grams of EGDMA (Ethylene Glycol Diimethacrylate), and 0.10 to 0.30 grams of Benzoyl Peroxide (Catalyst). The methacrylic acid is used as a catalyst here and other catalysts can be used, such as USP-245, AIBN, VAZO-64 and special UV catalysts. Also GMMA and other water increasing monomers can be used in place of methacrylic acid. After the HEMA formulation is mixed, the mixture is placed onto a magnetic stirrer with a Teflon stir bar at a spinning speed of approximately 300 to 500 RPM for, e.g., at least one hour.

As an example, a color formulation for the ink may include premixed colors with Titanium Dioxide ($TiO_2$) as the white pigment. This mixture is mixed and ball or mill rolled to break down the pigments and $TiO_2$ particles. Other components, including HEMA, catalysts, bonding agents, prepolymer and others are then added and mixed. Below are the mixtures of some colors as examples. Many other colors, shades and tones can be mixed. The listed weights can be converted into relative weight ratios of different components in each colored mix so that each mixture can be adjusted for smaller or larger quantities based on the relative weight ratios of different material components.

| Green |
|---|
| 3.67 grams green |
| 3.67 grams clear |
| 0.20 grams yellow concentrate |
| 1.15 grams HEMA |
| 0.30 grams HMD |
| 1.0 grams pre-polymer mix |

| Dark Green |
|---|
| 8.82 grams green |
| 1.38 grams HEMA |
| 0.36 grams HMD |
| 0.88 grams pre-polymer mix |

| BLUE |
|---|
| 8.76 grams Blue |
| 1.32 grams HEMA |
| 0.36 grams HMD |
| 1.02 grams prepolymer mix |

| Violet |
|---|
| 6.84 grams violet |
| 0.18 grams gray |
| 1.08 grams HEMA |
| 0.30 HMD |
| 0.54 grams pre-polymer mix |

| Hazel/Brown |
|---|
| 6.88 grams Brown or Hazel |
| 0.20 grams yellow concentrate |
| 1.04 grams HEMA |
| 0.28 grams HMD |
| 1.0 grams prepolymer mix |

Notably, the green, red, and blue colored ink mixtures above can be mixed together to create an ink in a dark brown color. This colored ink, when printed onto a blue tinted lens, appears as a black color. This black color is a "Blackless" black because the ink does not contain any carbon black pigment which is prohibited from use in contact lenses in U.S. Some contact lenses use an expensive black ink based on iron oxide which is permissible for use in contact lenses in U.S.

After the colors and monomer formulations are mixed they become activated. Mixing the colors for a few minutes at the beginning can ensure different materials in the mixture are well mixed. This process can be repeated about every 3 minutes for 15 minutes. After at least 15 minutes the INK becomes creamy with a smooth shiny appearance. The operator can now begin to print on the dry lenses or mold surfaces. The ink should be used or discarded after 2 hours.

The contact lenses with colored opaque ring patterns may be designed with UV light blockers to protect the eyes of the wearers. Materials like $TiO_2$ and Benzoyl peroxide are both natural and excellent UV blockers. In some implementations, other UV blockers may be added to the lens material (HEMA) to increase the overall performance and UV blocking properties of the lenses. One example of a UV blocking agent is 2-(4-Benzoyl-3-hydroxy-phenoxy) ethyl acrylate (16432-81-8). This blocking agent is commercially available in a white powder form. It is simply added to the HEMA monomer at levels of 1-3%. The mixture is then thoroughly mixed to ensure the powder has dissolved thoroughly in the monomer mix.

The above described inks may be printed on contact lenses via various processes. One process, for example, uses lens color-printing machines such as the commercial machines made by Guger Industries Co. Such lens color-printing machine may be a pad transfer-printing unit and may be operated based on a hydraulic system with a microprocessor to control the cycle time, speed and pressure. The machine may have a single print unit or may have multiple printing heads (e.g., 2, 4 or 6 heads) to print different colors on one lens.

The machine may be designed to include the following 6 primary functions and parts: Printing Plate, Silicone/Rubber ink transfer pad or pads, Doctor blade, Work stage with alignment micrometers and indexing table or conveyor, Ink cup or ink reservoir, and Inspection unit. The printing plate may include a polished stainless steel plate about 4 inches in width that has the desired design image of the print acid etched or laser etched onto its surface. The desired image or images are computer designed or artistically drawn and produced at approximately 15 to 25 to 1 scale. The designs are then reduced to the actual size of the image needed for printing the dry lens or molds. In the case of multiple colors, 2, 3, 4 or more plates are used. Also a printing plate with the company name, logo, trademark, inversion mark, or other information can be designed and printed onto the surface of the lens or molds. The depth of the printing plate image is very critical as it controls the amount of ink transferred onto the lens. This depth can also control the color or shade of the print. The depth of the plate can range from 0.008 to 0.025 microns. Different designs require different depths. Alignment of the printing plate or plates in the case of multi-color designs can be critical. The machine has precision X/Y axis micrometers that allow the experienced operator to align the printing plate, printing pad and work surface. This is a total of SIX (6) X/Y micrometers to print one color. Each time a color is added, another 4 to 6 precision micrometers may be added for precision alignment. In the case of 2 or more colors, this operation can be a difficult process as the size of the contact lens or molds are very small, and the placement and alignment of the prints are extremely important. Inspection of the alignment: A machinist microscope, loupe and 10× to 30× optical comparators are used to ensure that proper alignments are achieved and maintained.

The ink transfer pad may be made of a silicone rubber material. However natural rubbers can also be used. Several types of both materials can be used. The density, shape and design of the pad is also important and critical as it controls the intensity of the ink transferred and the sharpness of the ink transferred can be controlled by the design of the pad. The pad, the pad pressure, depth of the plate, doctor blade and the viscosity of the ink itself, effects many aspects of the print. From a casual observation it can appear basically easy and even simple. However this process is enormously complex, as many variables need to be controlled and come together in the final product.

The image can be transferred onto a convex or concave surface. This effects the size and design of the pad or pads. This will also effect the transfer of the image itself. An 11.00-mm image on the printing plate will not transfer 11.00-mm image on a convex or concave surface. Each surface will transfer the image a bit different on account of its different shape and radius of curvature.

The doctor blade is a sharp steel or aluminum blade that comes down onto the printing plate with adjustable force. It sweeps across the surface of the printing plate, forcing ink into the cavity of the image and removing excess ink. The doctor blade can also be replaced by a ceramic "ink cup". This ink cup works as a doctor blade and also a reservoir for holding the ink.

The work stage include lens holders (dry lens or molds) depending on which type of product is intended to be printed i.e. dry lens, convex or concave molds. Each requires their uniquely designed stage, mount or holder for the part to be held in place and easily printed with repeated consistency. The stage may be placed on top of a X/Y slide, it consists of many other parts and adjustment features. It is essential that the part presented onto the stage is easily aligned and held in place during the printing process. Molded parts are easy to hold in place as they are much larger then the contact lens itself and more durable and thus can easily be held in place by a chuck, taper, indexing fixture, vacuum fixture etc.

Printing dry contact lenses requires special attention, as the lenses are fragile and can easily become damaged. They are also much smaller than a typical mold. In this case, special holders are fabricated to hold the lens. The dry lens is held in a small step inside the sleeve of the holder centered by the outside diameter of the lens itself.

The holder is gently lowered onto a precision stage with the radius of the base curve machined onto the top of the stage with a smaller diameter then the diameter of the dry lens itself. This diameter is a precision fit and allows the holder to fit perfectly within a few thousands movement side to side. The stage also possesses 4 or more small holes evenly spaced where a gentle vacuum is applied. The lens stops on the stage, centered and held by the vacuum, while the holder slides down a bit more resting on an adjustable stop. This fully exposes the dry lens to the printing process, while the lens is firmly held in place by the vacuum.

After printing the lens, the holder is raised while the vacuum is gradually released. As the holder comes up, the dry lens is once again held in place by the step in the holder and placed onto a tray ready for curing in the oven. If two or more colors are desired on one lens, the lens should remain in position under the vacuum. The stage is then moved to be at a proper position under the next printing head. The printing process is repeated until all colors or designs are printed onto the lens surface.

In some implementations, one (1) precision holder may be used for each lens. Therefore hundreds or thousands of holders are necessary, they are machined from a Delrin plastic material which is similar to Teflon or Nylon in certain aspects but is much stronger and does not expand or contract as much when exposed to heat and can easily handle the high temperatures used in the curing process. The holders are not discarded but used over and over again, although expensive to machine, with proper care they can last many years or cycles. White and black Delrin plastic molds are used, this helps in easily separating different batches or lot numbers of lenses, parameters, powers etc.

The following sections describe one exemplary flow of the printing process using the above printing machine. Initially, the machine is set up and all the alignment features are adjusted to ensure the print on the lens or mold is centered and true. First, an ink is applied to the printing plate with a small brush. Two or more colors can be used with two or more heads required. The machine can be set for one cycle or continuous cycling. The holder with the dry lens or mold is placed onto the stage and the vacuum applied. After the ink is applied (or in the case of an ink cup) the start cycle button is pushed. The doctor blade comes down contacts the printing plate and sweeps across the plate removing the excess ink and forcing ink into the cavity of the image to be printed. The doctor blade comes up and returns to the starting position.

Subsequently, the silicone rubber transfer pad comes down. This pad is located directly above the image on the printing plate. When the pad comes down, the pad compresses onto the plate and then returns up. This process transfers the ink from the printing plate to the surface of the silicone rubber pad. The pad then moves forward above the stage and holder containing the lens or mold. The pad comes down again, however this time it compresses onto the dry lens or the surface of the mold. It returns up transferring the ink from the pad onto the surface of the lens or mold. The vacuum is released and the holder containing the dry lens or mold is removed and placed onto the tray. A new holder is placed onto the machine, vacuum is applied, and additional ink is brushed onto the image of the printing plate and the cycle is repeated.

If two or more colors are desired, addition steps are performed. Consider an example of having three colors. After the first color is printed, the stage would move and the lens would index under a second and third silicone pads each containing a different image and color. In the cycle which has three plates, three doctor blades pick up different color inks at the same time. The printing onto the lens can be made twice, three or four times, depending on the machine and the design. All the functions are controlled by hard stops or optical sensors, which can be fully controlled by up and down pressures of the printing pad and doctor blade. The position of the lenses or molds must all be adjusted and controlled to make the print centered on the lens.

The following sections describe the curing process and the bonding of the colored ink to the lens.

After each dry lens is printed, the lens is placed onto a tray, still retained by the holder, labeled and separated by powers, colors and other features. The tray is placed into a pre-heated vacuum oven. Once all trays are loaded into the oven, the door is closed and sealed. Vacuum is applied to the chamber and is increased to 60-76 cmHg.

In one implementation, the lenses can be heated at 50 degrees Celsius for 30 minutes. This allows for the evaporation of any unwanted solvents and the vacuum removes bubbles and gasses. The oven temperature is increased to 90 Degrees Celsius for 45 minutes. This is the point when the ink polymerizes and a bond between the ink and surface of the lens takes place. The heat catalyst fire and slight thermal reactions take place. The HEMA monomers in the ink mixture are fused with the HEMA on the surface of the lens and a bond takes place. The vacuum is still maintained pulling off gasses or bubbles from the ink monomer. The oven temperature is increased to 120 Degrees Celsius for another 45 minutes. This temperature is just below the melting temperature of the dry lens (approximately 125+) This process is very important as it allows the ink to get very hot and it melts onto the surface of the lens, laying down as smooth as possible. The vacuum is still applied pulling off any excess gasses or bubbles from the ink. This process ensures the high comfort level of the lenses when placed in the eyes. After 45 minutes at 120 Degrees Celsius, the oven is turned off. The chamber locks for the vacuum hoses are closed and the vacuum is turned off. However, the chamber still holds a vacuum! If the vacuum is released @ 120 degrees the lenses will collapse and melt! The lenses are allowed to slowly cool back down to room temperature or at least below 50 Degrees Celsius. This takes several hours and allows the lens and ink to cure and anneal slowly.

The vacuum is then slowly released allowing the chamber to reach normal atmospheric pressure. If the vacuum is released too quickly, this will cause a strong turbulence in the chamber, and the incoming rush of air will blow the lenses out of the holders and all over the oven. Care must be used to avoid this potential catastrophe. When the vacuum gauge reaches zero the door can be opened and the lenses and trays removed.

Next, the lenses are separated and placed into hydration baskets, each basket contains two lenses. The baskets are different colors to separate the powers and other features of the lenses. The lenses and baskets are placed into a 5000-ML beaker of buffered saline at room temperature and allowed to HYDRATE (ABSORB WATER AND BECOME SOFT) overnight or at least 6 hours. They are then transferred into another 5000-ML beaker of saline and heated to 75 degrees Celsius on a hotplate. There is a stirring mechanism that slowly stirs the lenses from the top. After a temp of 75 is reached a mild soap is added to the saline solution and the lenses are allowed to stir and clean for a least 2 hours. The heat and soap cleans the lenses and allows any impurities in the INK and HEMA to leach out (extraction). The lenses and baskets are then placed in a third 5000-ML beaker with fresh clean saline solution and rinsed. They are also stirred and the temperature is raised to 50-75 degrees Celsius.

The lenses are inspected dry while they are still in the holders. They are placed on glass trays and set onto a light table. Under magnification the print is inspected for quality and also the print must be centered. The colors must also match the acceptable color range parameters of two light and dark acceptable shades for that particular color. After hydration, the lenses are checked again wet and more emphasis is placed on the quality of the edge and the overall lens. This is performed in a wet cell using a 10× Optimec or a 30× optical comparator. The wet power of the lens is also read and the quality of the optics must be sharp and clean. Any rejects are recorded and discarded.

The above techniques and materials may be used to construct contact lenses with an opaque ring or circle design that uses the natural color of the patient or wearer's eye to enhance the beauty of the eye to produce younger and healthier and more natural appearance. The design of the ring or circle can also make the eye or colored portion of the eye to look slightly larger. The ring pattern on the peripheral or limbal portion of the lens can be fused or bonded into the lens surface. This bond in the limbal region creates a "Flexing Zone", allowing the lens to fit the cornea and eyeball much better. This Flexing Zone drapes to the individual contour of the sclera allowing a more superior comfortable fit. A contact lens having just the peripheral portions or limbal zone of the contact lens tinted or opaque colored may also be made. The peripheral portion of the lens may be colored in Black, Blue, Green, Violet, Hazel, Brown, Gray and other common colors which enhance the natural color or the wearer's natural eye color. The black color may be simulated by an ink that does not have any black pigment or dyes in the color itself. This ink may itself show a Dark Brown color from colored inks for Green, Blue, Red and other colors and creates a black appearance when printed onto a BLUE TINTED contact lens.

The above techniques and materials may also be used to produce contact lenses with the colors of the opaque pigments and printing paste mixed with Hema and Silicone or (Siloxane monomers) to increase the Oxygen Permeability or DK of the lenses. A tinted lens with a backbone structure of Blue, Green or Violet TINT may be printed with a color-changing opaque ring pattern to create a natural changed color in the eyes. Examples include green opaque ink printed onto green tinted Lenses, blue on blue, violets on violets or other combinations.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

In summary, only a few implementations are disclosed. However, it is understood that variations and enhancements may be made.

What is claimed is:

1. A device, comprising:
    a contact lens made of a contact lens material to fit into an eye; and
    a colored opaque ring pattern fused into a surface of the contact lens so that the colored opaque ring pattern is embedded in the contact lens material at the surface of the contact lens by forming a bond between an ink material of the colored opaque ring pattern and the contact lens material at the surface of the contact lens and an area of the surface of the contact lens where the colored opaque ring pattern is located is smooth, wherein the colored opaque ring pattern is positioned in the area of the contact lens surface to expose a central portion of the contact lens and to form a ring around the peripheral portion of the contact lens, the colored opaque ring pattern being smaller in diameter than the contact lens to leave a space on the contact lens between an outer edge of the opaque ring pattern and an outer edge of the contact lens;
    wherein the colored opaque ring pattern on a peripheral or limbal portion of the contact lens is bonded into the lens material at the surface to create a flexing zone that drapes to an individual contour of a sclera of the eye;
    wherein the colored opaque ring pattern comprises an inner edge that comprises a pattern of features extending towards the center of the contact lens with each feature decreasing in area as the feature extends towards the center of the contact lens; and
    wherein the colored opaque ring pattern comprises patterns of color that fade out as the patterns of color scatter in from the peripheral or limbal portion of the lens towards the center of the contact lens.

2. The device as in claim 1, wherein the colored opaque ring pattern comprises a first silicone material and the contact lens material comprises a second silicone material.

3. The device as in claim 1, wherein the contact lens is tinted with a translucent color.

4. The device as in claim 3, wherein the translucent color is a blue color and the colored opaque ring pattern is a dark brown color to generate a black color in combination with the blue color tinted in the contact lens, and wherein the colored opaque ring pattern comprises a mixture of colored inks free of a black ink.

5. The device as in claim 3, wherein the translucent color is a blue color and the colored opaque ring pattern is a dark brown color to generate a black color in combination with the blue color tinted in the contact lens, and wherein the colored opaque ring pattern comprises a mixture of colored inks free of a carbon black pigment.

6. The device as in claim 1, wherein the colored opaque ring pattern comprises a UV blocking material.

7. The device as in claim 6, wherein the colored opaque ring pattern comprises 2-(4-Benzoyl-3-hydroxy-phenoxy) ethyl acrylate to block UV light.

8. The device as in claim 1, wherein the colored opaque ring pattern comprises a white pigment.

9. The device as in claim 8, wherein the colored opaque ring pattern further comprises at least one non-white pigment which mixes with the white pigment to produce a desired opaque color.

10. The device as in claim 8, wherein the white pigment includes $TiO_2$.

11. The device as in claim 1, wherein only the peripheral or limbal portion of the contact lens is tinted, opaque colored or both tinted and opaque colored.

12. The device as in claim 2, wherein the second silicone material is different from the first silicone material.

13. A method comprising:
    applying a colored ink material to a surface of a printing plate having a desired design image of a ring pattern;
    transferring the colored ink material in a shape of the ring pattern from printing plate to transfer pad;
    transferring the colored ink material in the shape of the ring pattern from the transfer pad to a surface of a contact lens made of a contact lens material to fit into an eye; and
    curing the contact lens with the transferred on colored ink material in the shape of the ring pattern to form a colored opaque ring pattern fused into the surface of the contact lens so as to embed the colored opaque ring pattern in the contact lens material at the surface of the contact lens by forming a bond between the colored ink material of the colored opaque ring pattern and the contact lens material at the surface of the contact lens, and an area of the surface of the contact lens where the colored opaque ring pattern is located is smooth, wherein the colored opaque ring pattern is positioned in the area of the contact lens surface to expose a central portion of the contact lens and to form a ring around the peripheral portion of the contact lens, the colored opaque ring pattern being smaller in diameter than the contact lens to leave a space on the contact lens between an outer edge of the opaque ring pattern and an outer edge of the contact lens, wherein the curing the contact lens comprises:
        placing the contact lens with the transferred on colored ink material in a pre-heated vacuum oven,
        applying a vacuum pressure to remove bubbles and gases from the colored ink material
        heating the contact lens at a first temperature to evaporate unwanted solvents from the colored ink material,
        heating the contact lens at a second temperature that is higher than the first temperature to polymerize the colored ink material and form a bond between the ink material and the contact lens material at the surface of the contact lens,
        heating the contact lens at a third temperature that is higher than the second temperature and lower than a melting temperature of the contact lens to melt the colored ink material fused with the contact lens material at the surface of the contact lens; and
        cooling the contact lens to room temperature.

14. The method of claim 13, wherein transferring the colored ink material from the transfer pad to the contact lens comprises:
    contacting the contact lens with the transfer pad; and
    controlling a pressure of the transfer pad contacting the contact lens.

15. The method of claim 13, comprising:
    bonding the colored opaque ring pattern on a peripheral or limbal portion of the contact lens into the contact lens material at the surface of the contact lens to create a flexing zone that drapes to an individual contour of a sclera of the eye.

16. The method of claim 13, wherein the colored opaque ring pattern comprises an inner edge that comprises a pattern of features extending towards the center of the contact lens with each feature decreasing in area as the feature extends towards the center of the contact lens.

17. The method of claim 13, wherein the colored opaque ring pattern comprises patterns of color that fade out as the patterns of color scatter in from the peripheral or limbal portion of the lens towards the center of the contact lens.

18. The method of claim 13, wherein only the peripheral or limbal portion of the contact lens is tinted, opaque colored or both tinted and opaque colored.

19. The method of claim 13, wherein the colored opaque ring pattern comprises a white pigment.

20. The method of claim 13, wherein the contact lens is tinted with a translucent color; and wherein the translucent color is a blue color and the colored opaque ring pattern is a dark brown color to generate a black color in combination with the blue color tinted in the contact lens, and wherein the colored opaque ring pattern comprises a mixture of colored inks free of a carbon black pigment.

* * * * *